(12) United States Patent
Pierce

(10) Patent No.: US 6,738,823 B1
(45) Date of Patent: May 18, 2004

(54) USE OF ISOCHRONOUS PACKETS TO ELIMINATE REDUNDANT ACKNOWLEDGMENTS

(75) Inventor: Shaun Pierce, Redmond, WA (US)

(73) Assignee: Microsoft Corporation, Redmond, VA (US)

(*) Notice: Subject to any disclaimer, the term of this patent is extended or adjusted under 35 U.S.C. 154(b) by 0 days.

(21) Appl. No.: 09/494,273

(22) Filed: Jan. 31, 2000

(51) Int. Cl.[7] .................. G06F 15/16; H04L 12/66; H04J 3/16
(52) U.S. Cl. .................. 709/232; 709/231; 709/234; 709/246; 370/463; 370/466
(58) Field of Search .................. 370/466, 236, 370/413, 347, 225, 467, 463; 710/104, 3, 5, 316, 105; 713/200, 500; 714/748; 709/225, 234, 214, 246, 232, 231

(56) References Cited

U.S. PATENT DOCUMENTS

| | | | |
|---|---|---|---|
| 5,329,531 A | * 7/1994 | Diepstraten et al. | 370/347 |
| 5,991,304 A | * 11/1999 | Abramson | 370/413 |
| 6,134,662 A | * 10/2000 | Levy et al. | 713/200 |
| 6,243,395 B1 | * 6/2001 | Fujimori et al. | 370/466 |
| 6,292,844 B1 | * 9/2001 | Smyers et al. | 710/5 |
| 6,339,584 B1 | * 1/2002 | Gross et al. | 370/225 |
| 6,397,277 B1 | * 5/2002 | Kato et al. | 710/104 |
| 6,434,117 B1 | * 8/2002 | Momona | 370/236 |
| 6,493,769 B1 | * 12/2002 | Kawamura et al. | 710/3 |

OTHER PUBLICATIONS

Dan Steinberg and Yitzhak Birk, An Empirical Analysis of the IEEE–1394 Serial Bus Protocol, pp. 58–64, Jan. 2000.

* cited by examiner

Primary Examiner—John Follansbee
Assistant Examiner—Kenny Lin
(74) Attorney, Agent, or Firm—Banner & Wifcoff, Ltd.

(57) ABSTRACT

The present invention provides for transmitting asynchronous type data using isochronous packets over a 1394 compliant serial bus. Benefits of this type of communication include reducing overhead and increasing throughput. First, the transmitter(s) and the receiver(s) of the packet designate an isochronous channel for the communication. The request to transmit an asynchronous packet is converted into a request to transmit an isochronous packet. An isochronous packet is assembled and then the hardware is directed to transmit the packet over the channel asynchronously. Therefore the packet is transmitted as soon as possible, rather than waiting for the next opportunity to send an isochronous packet (which occurs at a rate of 8000 times/sec). Even though the packet is sent in an asynchronous manner, the hardware (transmitter and receiver) identifies the packet as isochronous and knows therefore not to generate any acknowledgments. When using isochronous transfer, generally the high-level protocol takes care of acknowledgments.

11 Claims, 8 Drawing Sheets

- PRIOR ART -

USE OF ISOCHRONOUS PACKETS TO ELIMINATE REDUNDANT ACKNOWLEDGMENTS

TECHNICAL FIELD

The present invention relates generally to the use of serial buses as a means of communication between electronic devices and, in particular, to the transmission of asynchronous data using isochronous packets across a serial bus, such as a serial bus operating in conformance with the IEEE 1394 Serial Bus Standard.

BACKGROUND OF THE INVENTION

Computer systems are typically comprised of a variety of different components or devices that operate together to form the resultant system. Some of the devices are supplied with the computer system initially, such as the central processing unit, and some devices can be installed into the computer system after the initial configuration of the system. The devices of the computer system are generally coupled together via interconnects which may be of several types, such as a serial bus.

Serial buses are well known in the art. A recently developed serial bus standard is the IEEE 1394 serial bus standard, disclosed in the ISO/IEC 13213 (ANSI/IEEE 1212) CSR Architecture Specification and the IEEE 1394-1995 Serial Bus Specification, the teachings of which are herein incorporated by this reference. A typical serial bus having an IEEE 1394 standard architecture is comprised of a multiplicity of nodes that are interconnected via point-to-point links, such as cables, that each connect a single node of the serial bus to another node of the serial bus. Each node is an addressable entity that can be reset and identified. Nodes are associated with respective components of the computer system and serve as interfaces between the components and communication links.

An IEEE 1394 compliant serial bus supports two types of packet transmission: asynchronous and isochronous. Asynchronous transmission is a form of communication that is not synchronized by a shared signal such as a clock. The data transmission may start at any time and is only throttled by how fast the sender can arbitrate for the bus. The characters are sent independent of each other and are separated by arbitrary intervals. To ensure that packets are not lost, asynchronous transmissions are automatically acknowledged by the receiver of the transmission. The acknowledgement lets the sender know that the receiver has received the request and will be sending a response. Likewise, when the receiver responds to the request, the original sender then sends an acknowledgement to let the original receiver know the response was received. Each acknowledgement generates additional traffic on the serial bus, thus reducing the effective bus bandwidth.

Isochronous transmission is a form of data transmission that can provide data at guaranteed intervals at a certain minimum data rate. This type of transmission is especially suitable for multimedia or time-dependent data such as audio or video because these types of transmissions need to arrive at close to the same rate of data flow as the source, whether it is from a peripheral device or from a network. A digital video camera is one example of a peripheral device that could use isochronous data transfer to feed digital image data to a computer. Isochronous transmission ensures a continuous and steady rate of transfer close to the ability of the receiver to accept and display the data. Isochronous transmissions are not automatically acknowledged by the receiver. Standard Ethernet cannot support isochronous traffic because other traffic may prevent the isochronous transmission from being carried. On Ethernet, the other traffic, or packets, may collide with the isochronous transmission destroying the packets.

There are many high level protocols used over a 1394 serial bus, such as server message block (SMB), or Novell Core Protocol (NCP), which ensure packet delivery at higher protocol levels. When using such protocols, transmitting packet acknowledgements at the bus level is redundant because the response itself is an implicit acknowledgement of the request.

Currently, when a high level protocol performs operations using a guaranteed delivery IEEE 1394 primitive like asynchronous read/write/lock, each request or response to request that is received is automatically acknowledged for receipt. A primary example is communication between a redirector and a server. A redirector is a software entity which allows a personal computer (PC) to see files and/or services of a remote computer. Normally, a redirector would use asynchronous transmission for data requests to a server. A server is a software entity which shares its local files and/or services to a redirector across a medium like a network. In FIG. 1, for example, at step 2, a redirector sends a read request to a server in an asynchronous manner. Upon receiving the request, the server sends, at step 4, an acknowledgement for receiving the request to the redirector. In other words, the server "acks" receipt of the request. Then at step 6, the server sends the response to the request. The redirector, upon receiving the response, then sends, at step 8, an acknowledgement for receiving the response to the original read request. In this manner, four messages (a request, a response and two acknowledgements) are transmitted for a simple read request. The two acknowledgement packets use up valuable bandwidth on the bus, thus reducing throughput.

A more detailed illustration of the process is shown in FIG. 2. At the redirector, a request 10, the path of which is shown as a solid line, is sent to the guaranteed delivery function 12 within the high-level message protocol 14. The request 10 is then transferred to the asynchronous delivery function 16 within the 1394 protocol 18. The asynchronous delivery function 16 sends the request 10 to the asynchronous transmitter 20 which then sends the request 10 across the serial bus 22. There is also present within the 1394 protocol 18 an isochronous delivery function in communication with an isochronous transmitter, but these will not be discussed here as they are not within the path of the request 10. At the server, the receiver 24 within the 1394 protocol 26 receives the request 10 and forwards the request 10 to the asynchronous delivery function 28.

The asynchronous delivery function 28, upon receiving the request 10, generates an acknowledgement (ACK) 30 to acknowledge the receipt of the request 10. The path of the ACK 30 is shown by an uneven dashed line. The ACK 30 is sent to the asynchronous transmitter 32 within the server which in turn sends the ACK 30 across the serial bus 22. The receiver 34 within the 1394 protocol 18 of the redirector receives the ACK 30 and forwards the ACK 30 to the asynchronous delivery function 16. As the asynchronous delivery function 28 of the server generates the ACK 30, it also sends the request 10 to the guaranteed delivery function 36 within the high-level message protocol 38. The request 10 is then passed on up the chain where a response is generated.

At the server, a response 40, the path of which is shown as an even dashed line, is sent to the guaranteed delivery function 36 within the high-level message protocol 38. The response 40 is then transferred to the asynchronous delivery function 28 within the 1394 protocol 26. The asynchronous delivery function 28 sends the response 40 to the asynchronous transmitter 32 which then sends the response 40 across the serial bus 22. There is also present within the 1394 protocol 26 an isochronous delivery function in communication with an isochronous transmitter, but these will not be discussed here as they are not within the path of the response 40. At the redirector, the receiver 34 within the 1394 protocol 18 receives the response 40 and forwards the response 40 to the asynchronous delivery function 16.

The asynchronous delivery function 16, upon receiving the response 40, generates an acknowledgement (ACK) 42 to acknowledge the receipt of the response 40. The path of the acknowledgement 42 is shown by an uneven dashed line as is the path of the ACK 30. The ACK 42 is sent to the asynchronous transmitter 20 within the redirector which in turn sends the ACK 42 across the serial bus 22. The receiver 24 within the 1394 protocol 26 of the server receives the ACK 42 and forwards the ACK 42 to the asynchronous delivery function 28. As the asynchronous delivery function 16 of the redirector generates the ACK 42, it also sends the response 40 to the guaranteed delivery function 12 within the high-level message protocol 14. The response 40 is then passed on up the chain.

SUMMARY OF THE INVENTION

The present invention provides for "ackless" communication by transmitting asynchronous data in an isochronous packet. Benefits of this type of communication include reducing overhead and increasing throughput. The transmitter(s) and the receiver(s) of the packet designate an isochronous channel for the communication. The request to transmit an asynchronous packet is converted into a request to transmit an isochronous packet. An isochronous packet is assembled and then the hardware is directed to transmit the packet over the channel asynchronously. Therefore the packet is transmitted as soon as possible, rather than waiting for the next opportunity to send an isochronous packet (which occurs at a rate of 8000 times/sec). Even though the packet is sent in an asynchronous manner, the hardware (transmitter and receiver) sees the packet as isochronous and knows therefore not to generate any acknowledgments. When using isochronous transfer, generally the high-level protocol takes care of ensuring that packets are received by the recipient.

DETAILED DESCRIPTION OF THE INVENTION

Figure 3:
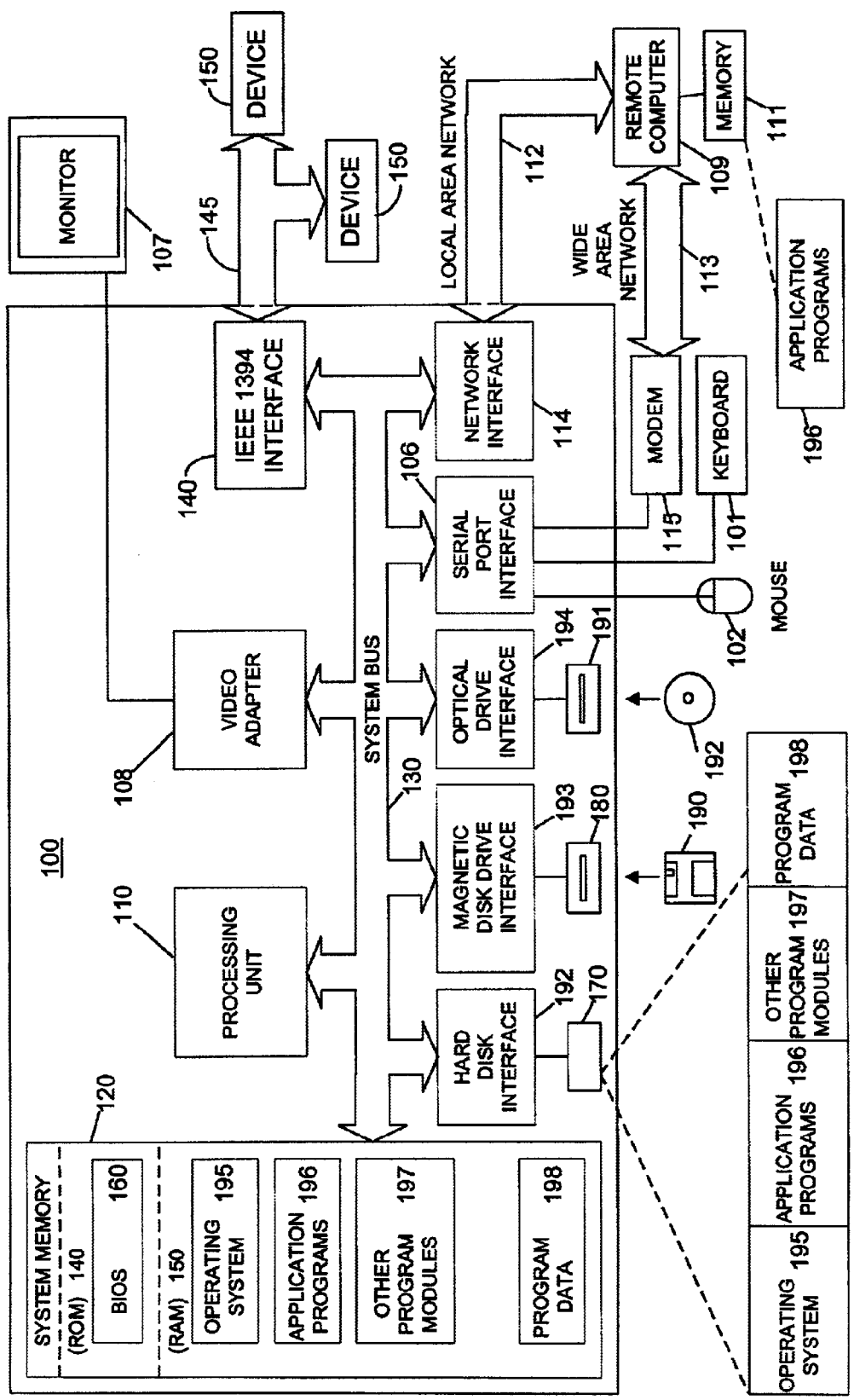
FIG. 3 is a block diagram of an exemplary operating environment.

The present invention may be more fully described with reference to FIGS. 3–8. FIG. 3 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output-devices (not shown), such as speakers and printers.

An additional serial port in the form of an IEEE 1394 interface 140 may also be provided. The IEEE 1394 interface 140 couples an IEEE 1394-compliant serial bus 145 to the system bus 130 or similar communication bus. The IEEE 1394-compliant serial bus 145, as known in the art, allows multiple devices 150 to communicate with the computer 100 and each other using high-speed serial channels.

Computer 100 can operate in a networked environment using logical connections to one or more remote computers, such as a remote computer 109. Remote computer 109 typically includes at least some of the elements described above relative to computer 100, although only a memory storage device 111 has been illustrated in FIG. 3. The logical connections depicted in FIG. 3 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 and remote computer 109 may both include a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. For example, in an embodiment of the present invention, the remote computer 109 is a server having stored thereon one or more documents that may be accessed by the computer 100.

Procedures of the present invention to be described below can operate within the environment of the computer shown in FIG. 3. The present invention is generally applicable to a computer operating in accordance with the IEEE 1394 standard.

Figure 4:
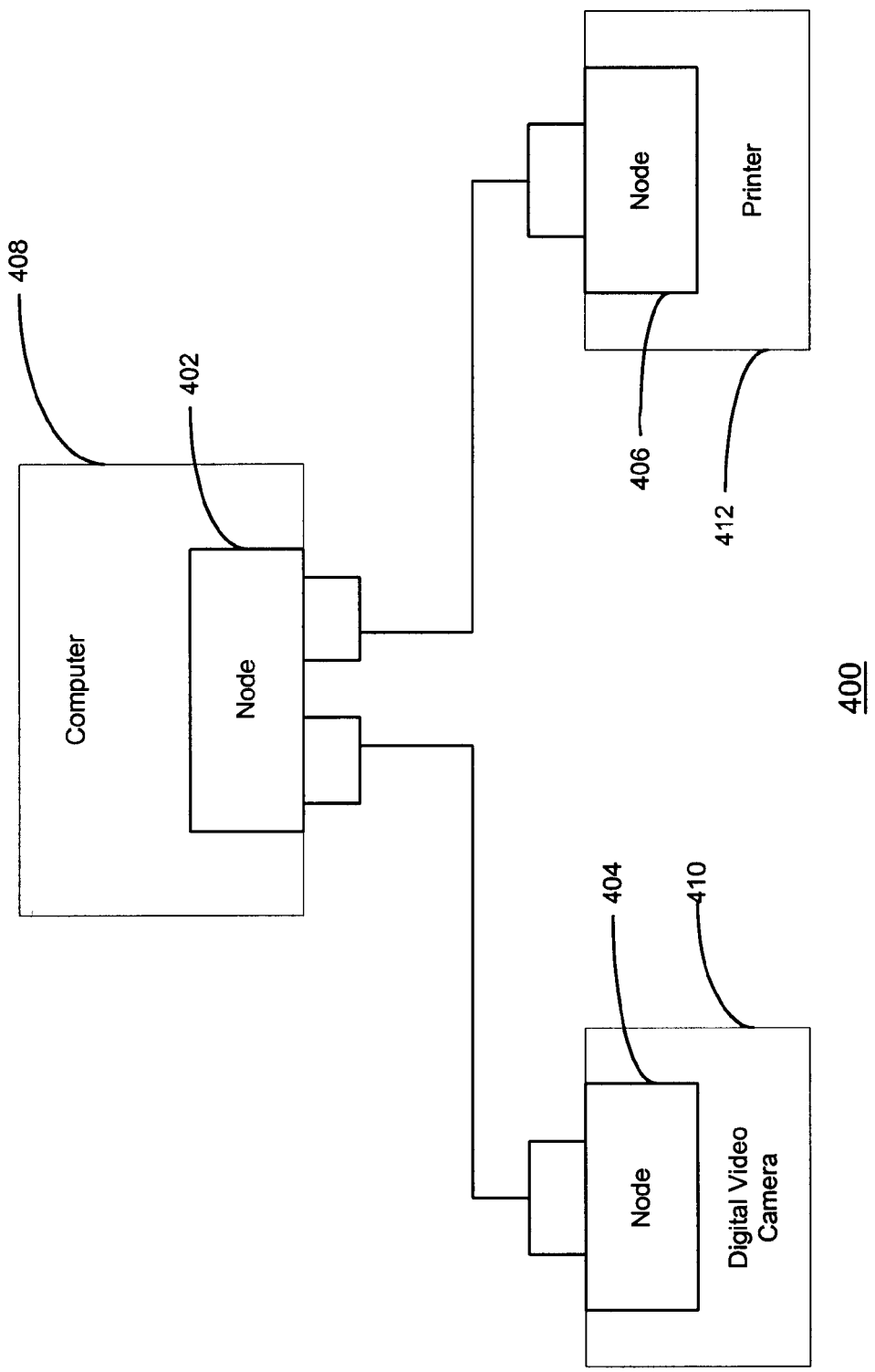
FIG. 4 is a block diagram of nodes connected together via a serial bus through which the present invention may be implemented.

Several devices can be interconnected via an IEEE 1394 compliant serial bus as illustrated in FIG. 4. The system 400 comprises several nodes 402–406, each coupled to a device 408–412. Each node is an addressable entity that can be reset and identified. Nodes are associated with respective components of the computer system and serve as interfaces between the components and the serial bus.

FIG. 5 again uses the example of a redirector sending a read request to a server to illustrate communication in accordance with the present invention. With certain high level protocols, such as server message block (SMB), there is always a response to every request. Those skilled in the art will recognize that other redirector/server protocols may be used. Because there is always a response to the request, any acknowledgement to the original request would be redundant. These high level protocols are already designed to deal with unreliability, such as issuing retries if no response is received within a predetermined time. This is simple when the request is "stateless," such as a read, write or seek request, because the request can be tried over and over with no consequence. However, with requests such as open, delete or lock, the packets may contain state so the request can not be resent continuously. For example, a delete request is sent to a server. The server receives the request and performs the delete. The server sends its response that the file has been deleted to the redirector. The response is some how lost or destroyed. After the predetermined time, the redirector might send another request, assuming the first request was never received. The server should also retain some state as to the last request, else it will attempt to carry out the delete again. This time, however, an error that file does not exist is generated and sent to the redirector, even though the original request was successful. If the server retains state, it could regenerate the response to the redirector.

Figure 1:
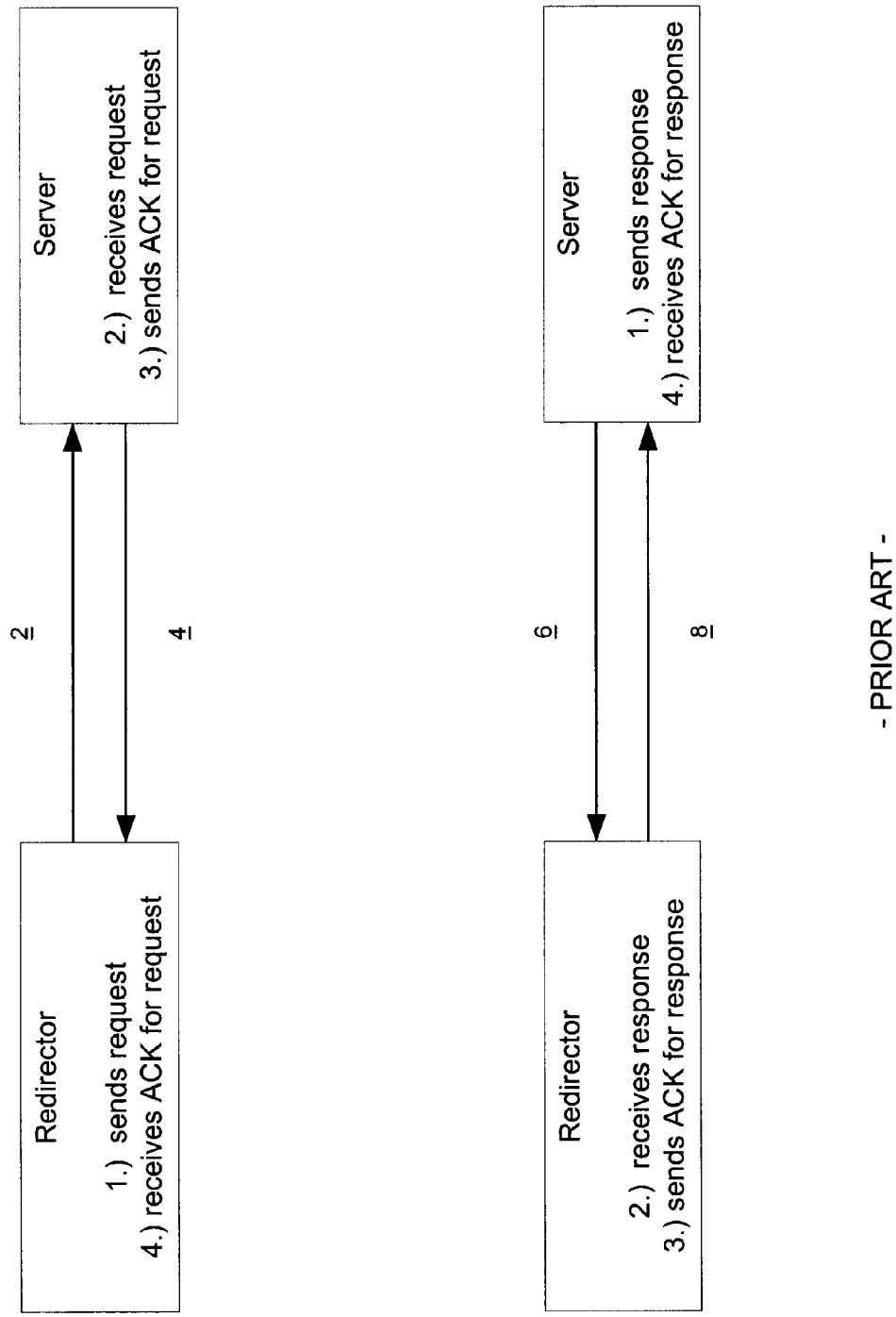
FIG. 1 illustrates asynchronous transmission that is currently known in the art.
Figure 2:
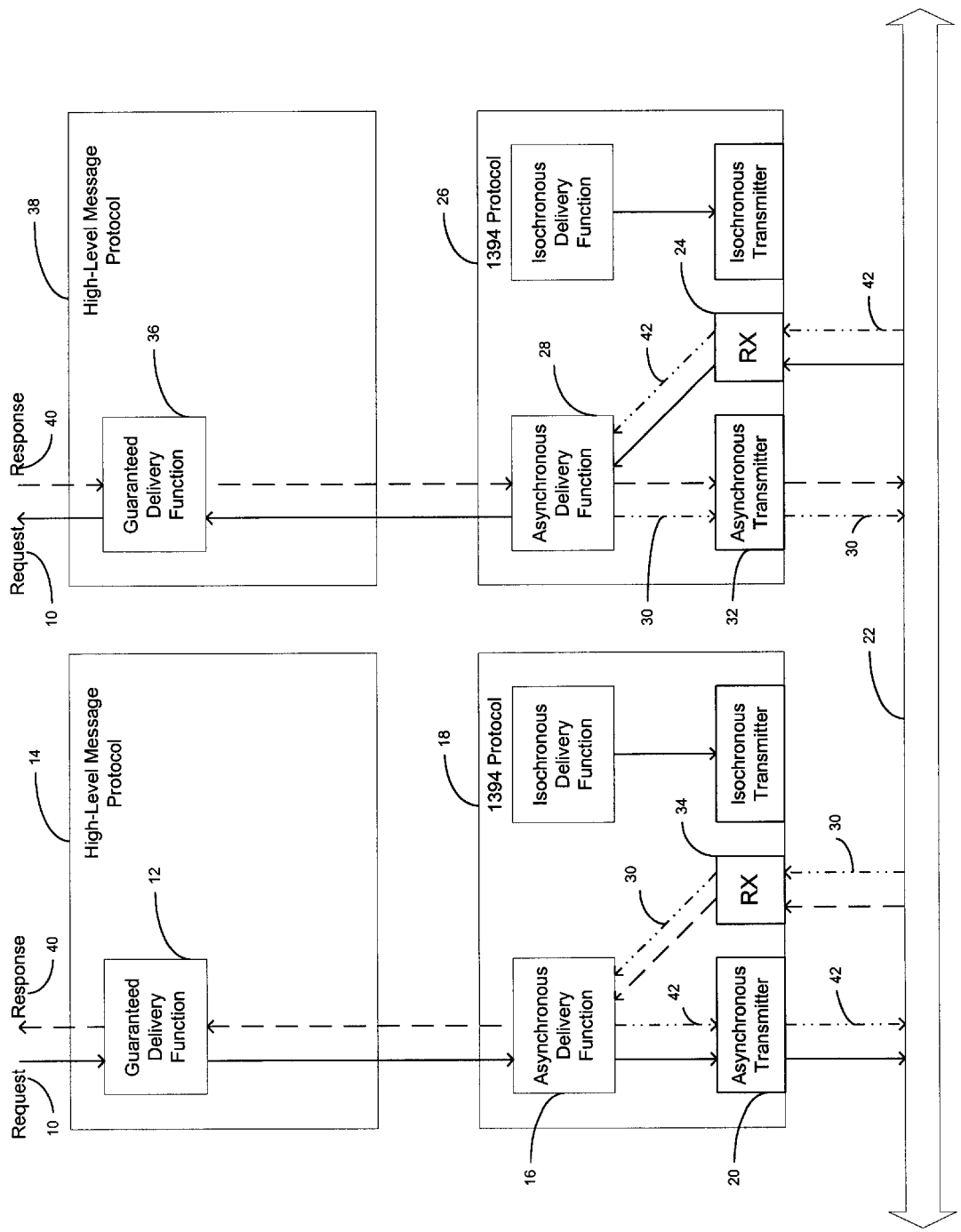
FIG. 2 also illustrates asynchronous transmission that is currently known in the art.
Figure 5:
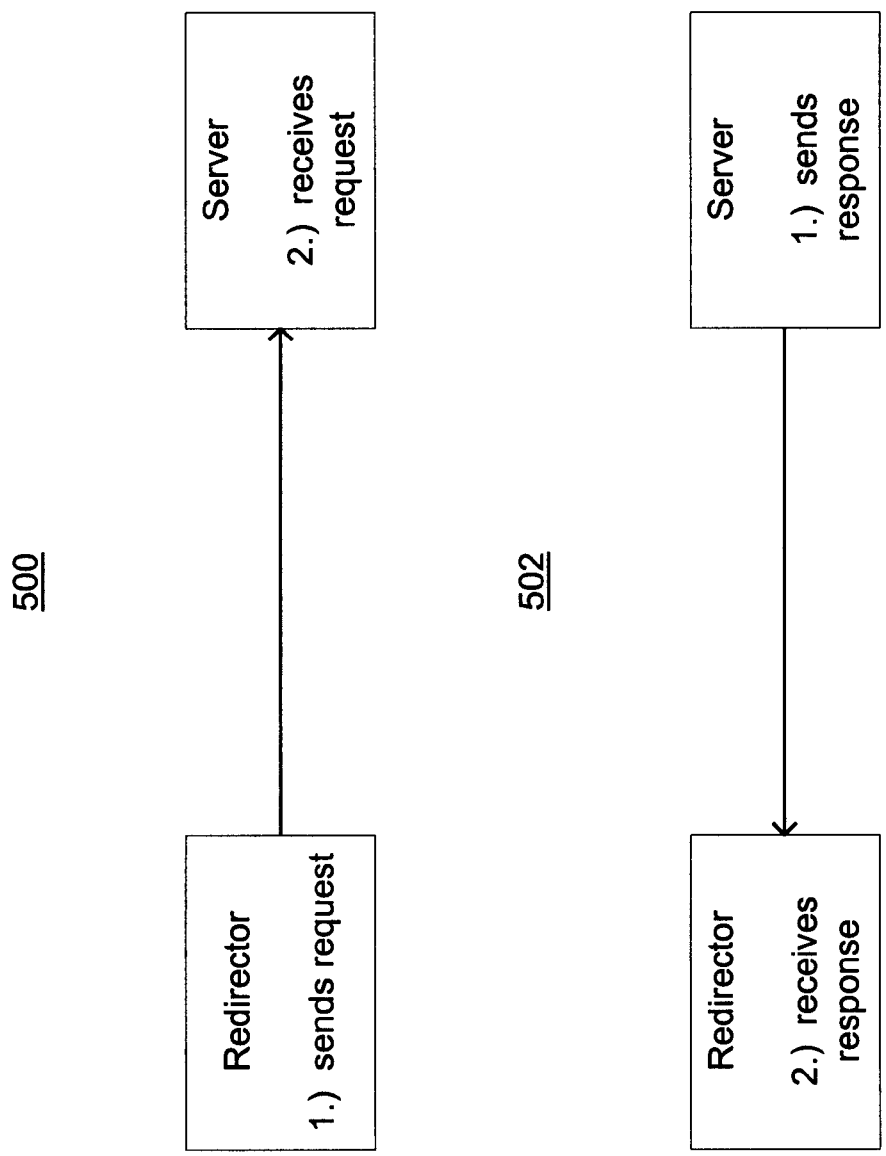
FIG. 5 illustrates "ackless" transmission in accordance with the present invention.

If such a high level protocol is used, then the redirector and server can use isochronous packets for transmission. Referring now to FIG. 5, at step 500, a redirector sends a read request to a server (this time the request is an isochronous packet transmitted asynchronously). The server identifies the incoming request as an isochronous packet and knows therefore not to generate an acknowledgement. Instead, the server, at step 502, sends the response to the request in the same manner (the response is an isochronous packet transmitted asynchronously). Again, because the redirector identifies the response as an isochronous packet, it knows therefore not to generate an acknowledgement. In this manner, only two messages (a request and a response) are transmitted for a simple read request as compared to the prior art as illustrated in FIG. 1, which required four messages.

Figure 6:
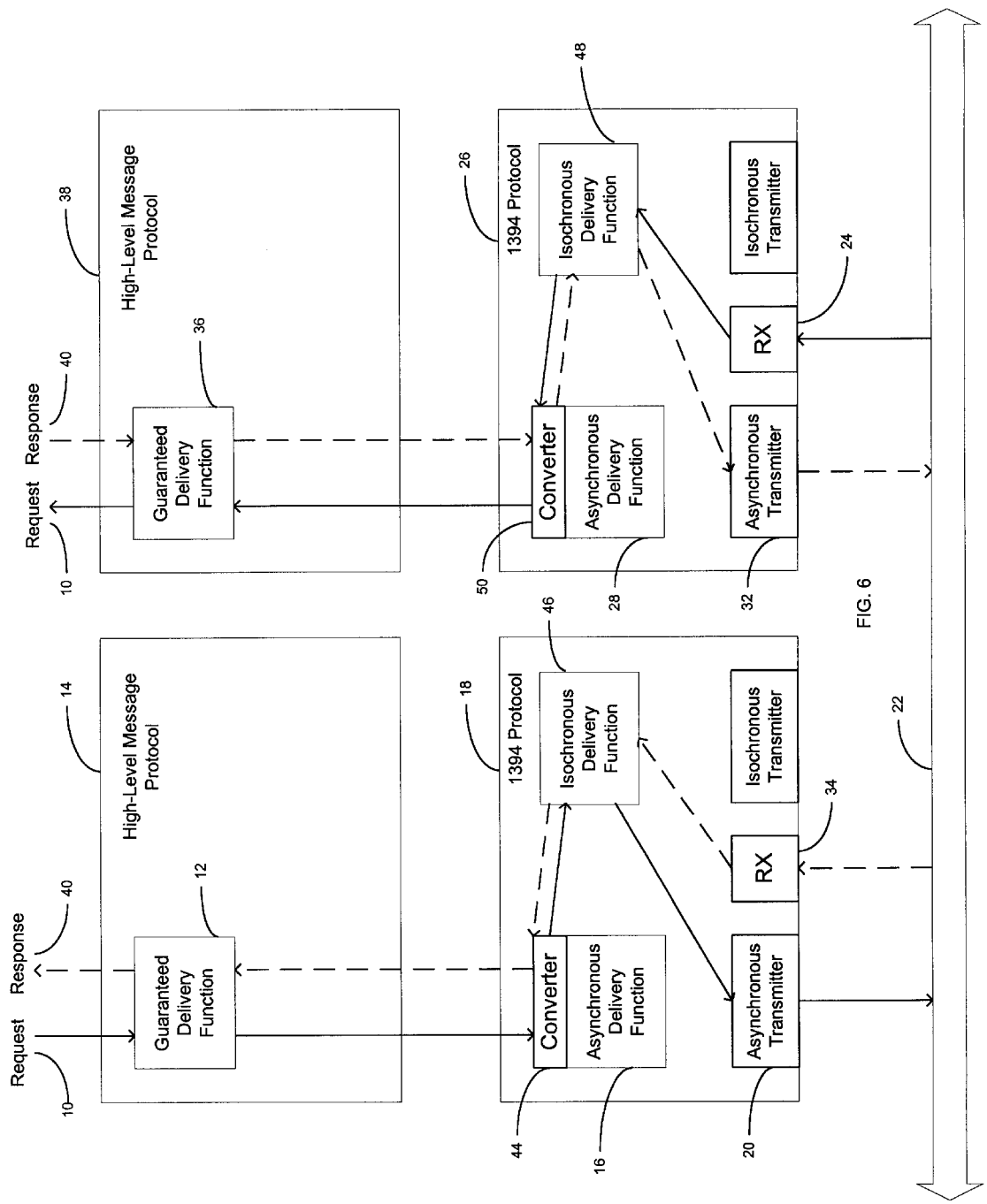
FIG. 6 also illustrates "ackless" transmission in accordance with the present invention.

A more detailed illustration of the process is shown in FIG. 6. At the redirector, a request 10, the path of which is shown as a solid line, is sent to the guaranteed delivery function 12 within the high-level message protocol 14. The request 10 is then transferred to the converter 44 within the 1394 protocol 18, where the request to transmit an asynchronous packet is converted to a request to transmit an isochronous packet. The converter 44 then forwards the request 10 to the isochronous delivery function 46. The isochronous delivery function 46 sends the request 10 to the asynchronous transmitter 20 which then sends the request 10 across the serial bus 22. There is also present within the 1394 protocol 18 an isochronous transmitter, but it will not be discussed for this illustration as it is not within the path of the request 10. However, the invention principles are not limited to asynchronous transmission but could also include isochronous transmission. The receiver 24 within the 1394 protocol 26 of the server receives the request 10 and forwards the request 10 to the isochronous delivery function 48 because of the isochronous packet type of the request 10. However, by virtue of the isochronous channel that the request 10 was received on, the isochronous delivery function 48 knows that the packet should be reformatted, or converted, into an asynchronous packet and transmitted up the chain. Therefore, the isochronous delivery function 48 sends the request 10 to the converter 50 which strips the asynchronous data out of the isochronous packet before it forwards the request 10 to the guaranteed delivery function 36 within the high-level message protocol 38. The request 10 is then passed on up the chain where a response 40 is generated.

At the server, a response 40, the path of which is shown as a dashed line, is sent to the guaranteed delivery function 36 within the high-level message protocol 38. The response 40 is then transferred to the converter 50 within the 1394 protocol 26 where the request to transmit an asynchronous packet is converted to a request to transmit an isochronous packet. The converter 50 then forwards the response 40 to the isochronous delivery function 48. The isochronous delivery function 48 sends the response 40 to the asynchronous transmitter 32 which then sends the response 40 across the serial bus 22. There is also present within the 1394 protocol 26 an isochronous transmitter, but it will not be discussed for this illustration as it is not within the path of the response 40. However, the invention principles are not limited to asynchronous transmission but could also include isochronous transmission. The receiver 34 within the 1394 protocol 18 of the redirector receives the response 40 and forwards the response 40 to the isochronous delivery function 46 because of the isochronous packet type of the response 40. Again, by virtue of the isochronous channel that the response 40 was received on, the isochronous delivery function 46 knows that the packet should be reformatted, or converted, into an asynchronous packet and transmitted up the chain. The isochronous delivery function 46 sends the response 40 to the converter 44 which strips the asynchronous data out of the isochronous packet before it forwards the response 40 to the guaranteed delivery function 12 within the high-level message protocol 14. The response 40 is then passed on up the chain.

Figure 7:
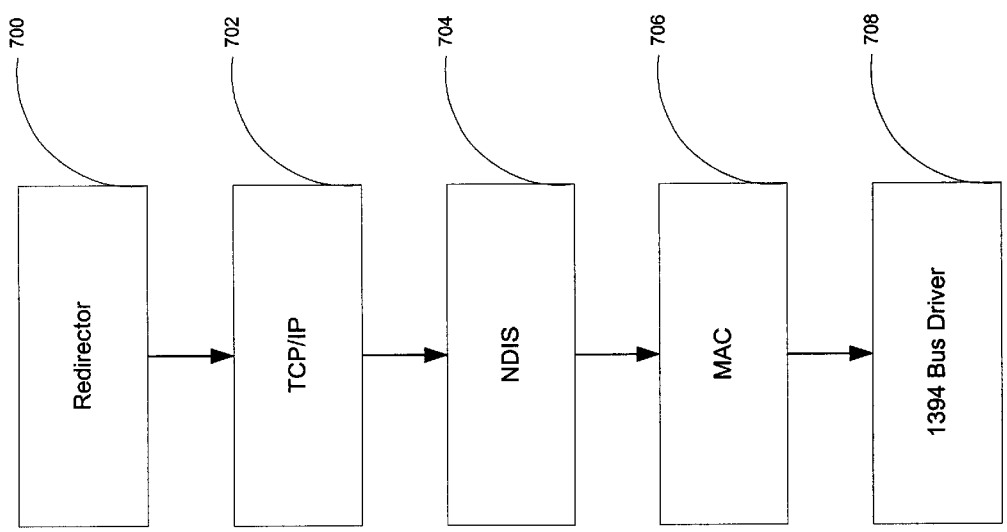
FIG. 7 is a block diagram of a software structure through which the present invention may be implemented.

In FIG. 7, the redirector 700 generates a read command. That command is passed to the TCP/IP 702 which passes the packet to the network device interface specification (NDIS) 704 and sent to media access control (MAC) 1394 driver 706. At MAC 706, the system wraps the packet in the appropriate 1394 packet headers and generates a request to send a 1394 asynchronous packet. It does this by passing the completed packet to the 1394 bus driver 708. As will be discussed in further detail in FIG. 8 and which is not shown in FIG. 7, the request to send an asynchronous packet is converted to a request to send an isochronous packet. The request is forwarded to an asynchronous transmitter and then transmitted over the bus to the server.

Figure 8:
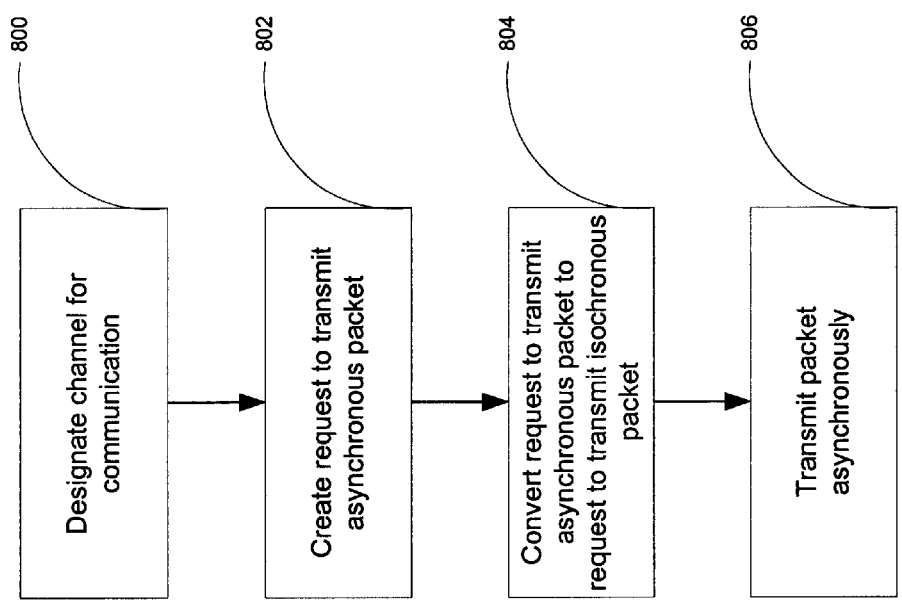
FIG. 8 is a flowchart illustrating a method of communicating in accordance with the present invention.

In FIG. 8, a method of communicating between a sender and a receiver in accordance with the present invention is illustrated. At step 800, the sender and the receiver designate a channel for communication. The sender and receiver negotiate the channel designation in accordance with the IEEE 1394 standard. With multiple nodes on a serial bus as shown in FIG. 4, the channel could be set up so any node with an "interest" in the communication could listen to a particular channel where all relevant messages would be broadcast. However, those skilled in the art would recognize that private communications could also be set up. At step 802, a request to transmit a packet asynchronously is created. At step 804, the request to transmit an asynchronous packet is converted to a request to transmit an isochronous packet. The header of the packet created would be an isochronous packet header to prepare the request for isochronous transmission. A "tCode A" packet is used to indicate an isochronous packet. At step 806, the packet is transmitted asynchronously. Despite the request to transmit the packet isochronously, the request is sent to an asynchronous transmitter, rather than an isochronous transmitter. In this manner, the packet is transmitted asynchronously rather than isochronously. This means that the packet is sent as soon as possible rather than waiting for the next opportunity to pass by the isochronous transmitter which occurs at a rate of 8000 times per second. The receiver sees the incoming data as an isochronous transmission regardless of how the packet was sent. Therefore, the receiver does not generate any acknowledgements.

One of the benefits of the invention is the reduction of redundant response and acknowledgement packets during asynchronous transmission which reduces overhead. Another benefit of the invention is increased throughput over the bus. This method increases performance because the receiver does not have to wait for the next arbitration gap in order to send the acknowledgement. In fact, the receiver sends no acknowledgements at all. Without the extra, redundant acknowledgements, more actual requests and responses can be sent. The high-level protocol ensures that all packets are received and also is responsible for issuing retries if requests or responses get lost. Thus, there is no need for acknowledgements. Another advantage of using asynchronous over isochronous transmission for isochronous packets is that asynchronous transmission is faster. An asynchronous transmitter can send data as quickly as it can arbitrate for the serial bus. However, an isochronous transmitter must wait for the next opportunity to send which only occurs at a rate of 8000 times per second.

Although the invention has been described in relation to preferred embodiments, many variations, equivalents, modifications and other uses will become apparent to those skilled in the art. The present invention should not be limited to the specific disclosure but determined only by the appended claims.

What is claimed is:

1. A method of communicating between a transmitter and a receiver over a bus comprising the steps of:

designating an isochronous channel for communication;

generating a request to transmit an asynchronous packet in the isochronous channel;

converting the request to transmit the asynchronous packet to a request to transmit an isochronous packet by wrapping the asynchronous packet with an isochronous header; and transmitting the converted packet asynchronously over the bus in the isochronous channel.

2. The method of claim 1 wherein the bus is a serial bus.

3. The method of claim 2 wherein the serial bus is an IEEE 1394 compliant serial bus.

4. The method of claim 1 further comprising in combination the step of:

using a high-level protocol with a guaranteed delivery function.

5. The method of claim 1 further comprising the step of:

maintaining state in the transmitter so a request that requires state is not resent continuously.

6. The method of claim 1 further comprising the step of:

maintaining state in the receiver so a response to a request that requires state can be regenerated.

7. A computer node coupled to a bus comprising in combination:

a high-level message protocol including a guaranteed delivery function that guarantees that a data packet transmitted over the bus is received by an intended recipient; and a lower-level message protocol including an asynchronous packet service providing guaranteed delivery and an isochronous packet service lacking guaranteed delivery, each service adapted to operate in accordance with standard packet types defined for the bus;

wherein the lower-level message protocol converts a request from the high-level message protocol to transmit an asynchronous data packet into a request to transmit an isochronous data packet wherein the asynchronous data packet is wrapped with an isochronous header and transmitted over the bus asynchronously by the lower-level message protocol.

8. The computer node of claim 7 wherein the lower-level message protocol transmits the data packet over the bus using an asynchronous bus transmitter.

9. The computer node of claim 7 wherein the lower-level message protocol establishes a common isochronous data channel to be used for communicating with another computer node on the bus prior to transmitting the data packet.

10. The computer node of claim 7 wherein the bus is an IEEE 1394 compliant bus.

11. A system comprising two nodes each constructed in accordance with claim 7, wherein the two nodes communicate over the same bus.

* * * * *

UNITED STATES PATENT AND TRADEMARK OFFICE
CERTIFICATE OF CORRECTION

PATENT NO. : 6,738,823 B1
DATED : May 18, 2004
INVENTOR(S) : Shaun Pierce

It is certified that error appears in the above-identified patent and that said Letters Patent is hereby corrected as shown below:

<u>Title page,</u>
Item [73], Assignee, delete "VA" and insert -- WA -- therefore.

Signed and Sealed this

Tenth Day of May, 2005

JON W. DUDAS
*Director of the United States Patent and Trademark Office*